(12) United States Patent
Kurtz (10) Patent No.: US 8,186,101 B2
(45) Date of Patent: May 29, 2012

(54) LIVE GOODS PLANTER CAGE AND CONTAINER

(75) Inventor: Jennifer A. Kurtz, Cheshire, CT (US)

(73) Assignee: Hubie Grown, LLC, Chesire, CT (US)

( * ) Notice: Subject to any disclaimer, the term of this patent is extended or adjusted under 35 U.S.C. 154(b) by 53 days.

(21) Appl. No.: 12/448,686

(22) PCT Filed: Dec. 28, 2007

(86) PCT No.: PCT/US2007/026464
§ 371 (c)(1),
(2), (4) Date: Dec. 18, 2009

(87) PCT Pub. No.: WO2008/082639
PCT Pub. Date: Jul. 10, 2008

(65) Prior Publication Data
US 2010/0101144 A1    Apr. 29, 2010

Related U.S. Application Data

(60) Provisional application No. 60/877,728, filed on Dec. 28, 2006.

(51) Int. Cl.
A01G 9/12      (2006.01)
A01G 17/06    (2006.01)
A01G 17/14    (2006.01)

(52) U.S. Cl. .............................................. 47/70; 47/45

(58) Field of Classification Search ................ 47/45, 70; 119/416, 431, 461, 474
See application file for complete search history.

(56) References Cited

U.S. PATENT DOCUMENTS

| | | | | |
|---|---|---|---|---|
| 425,745 | A | * | 4/1890 | Brown .............................. 47/47 |
| 4,631,861 | A | * | 12/1986 | Wuthrich .......................... 47/70 |
| 5,544,619 | A | * | 8/1996 | Braun ........................... 119/474 |
| 5,804,261 | A | | 9/1998 | Schwarzenberg .............. 428/27 |
| 2002/0108303 | A1 | | 8/2002 | Layton, Jr. ....................... 47/45 |

FOREIGN PATENT DOCUMENTS

| | | |
|---|---|---|
| GB | 582 810 | 11/1946 |
| GB | 2 280 584 | 2/1995 |
| GB | 2 387 758 | 10/2003 |

* cited by examiner

*Primary Examiner* — Monica Williams
(74) *Attorney, Agent, or Firm* — Ware, Fressola, Van Der Sluys & Adolphson LLP (57) ABSTRACT

Planter apparatus for supporting live goods has an upwardly open container with a sidewall, a wire planter cage frame supported on the sidewall, and clips releasably securing the planter cage frame to the container. The planter cage frame has downwardly extending legs with distal ends that are received on an inner peripheral ledge of the container. The distal ends may engage the container without clips, or may rest on the rim of the container. The clips are deformable C-shaped clips with end hooks that engage the container rim and a transverse rib of the planter cage frame.

10 Claims, 10 Drawing Sheets

LIVE GOODS PLANTER CAGE AND CONTAINER

RELATED APPLICATIONS

This application claims priority to U.S. provisional patent application Ser. No. 60/877,728, filed Dec. 28, 2006.

TECHNICAL FIELD

The present invention relates generally to containers for plant live goods and more particularly to a planter cage frame and container assembly.

BACKGROUND OF THE INVENTION

Plant containers for live goods, such as flowers and vegetables, come in many shapes and sizes and are made from a number of different materials, such as clay, terra cotta and more recently, plastics. For climbing plants, or tall, stemmed live goods such as tomato plants that can become top-heavy as they mature, a stake or other type of rod is generally inserted in soil in the container to provide support.

The live goods themselves can cause the stake or rod to topple if the top portion of the live goods becomes heavy and unbalanced, and wind and rain can contribute to this problem. It is also difficult to move containers with growing plants supported by stakes as the stakes tend to fall over as the container is moved. In addition, the container itself is often hard to grip, lift and hold when a sizeable plant is growing from the soil up a stake or rod extending from the soil.

Therefore, what is needed is a container and support for live goods that is easy to move and resistant to toppling and yet provides needed support for live goods such as climbing plants or tall stemmed plants.

SUMMARY OF THE INVENTION

Accordingly, it is a principal object of the invention herein to provide improved planter apparatus for growing live plant goods, and especially live plant goods that are climbing plants or tall stemmed live plant goods such as tomato plants.

It is an additional object of the invention to provide improved planter apparatus for supporting live goods including a planter cage frame that is releasably attachable to a container.

It is another object of the invention herein to provide a planter apparatus including a plant support that resists tipping or pulling free from the container.

It is a further object of the invention herein to provide a planter apparatus that may be easily moved from location to location.

In carrying out the invention herein, a planter apparatus for supporting live goods has an upwardly open container with a bottom, and a sidewall extending from the bottom and including a top rim. A planter cage frame is configured with a plurality of downwardly extending legs arranged in spaced relationship with respect to each other, and at least one transverse rib located between each of two adjacent downwardly extending legs and spaced upwardly of respective distal ends of the legs. The distal ends of the downwardly extending legs are adapted to engage the container sidewall. At least one and preferably two opposed clips are arranged for releasable attachment between the transverse rib and the sidewall for releasably securing the planter cage frame on the upwardly open container extending upwardly therefrom, thereby retaining the planter cage frame and container together as a single cooperative assembly.

In one aspect of the invention, the sidewall of the container defines an inner peripheral ledge spaced downwardly from the rim, and the ends of the downwardly extending legs rest on the inner peripheral ledge.

In another aspect of the invention, the clip has a first end cooperatively configured to engage a transverse rib of the planter cage frame and a second end cooperatively configured to engage a rim of the container sidewall. In a specific aspect, the container rim includes a downwardly extending rim edge, and the clip has a hook end configured to hook onto the rim edge. The other end of the clip is also configured as a hook to hook onto the transverse rib. In a more specific aspect, the clip is configured in a curved or "C" shape and is made of a resilient, memory retentive material and has hooks on its respective ends, whereby the clip is responsive to bending force for straightening its curved shape and thereby lengthening the distance between the ends to facilitate attaching the clip between a transverse rib of the planter cage frame and the container rim. Upon release of the bending force, the clip contracts to secure the planter cage frame to the container.

In further aspects of the invention, the container wall defines a rectangular shaped opening and the planter cage frame is configured with four downwardly extending legs respectively having distal ends engaged with the container at the corners of the rectangular shaped opening. The rectangular shaped opening may be elongated and additional downwardly extending legs may be provided between the corners. The rectangular opening may be square. The container opening may also be round, and the planter cage frame cooperating with the round opening may have three spaced apart downwardly extending legs.

The foregoing and other objects and features herein will be readily understood from the following description of the invention and the claims, taken together with the drawings.

BRIEF DESCRIPTION OF DRAWINGS

The same reference numerals refer to the same elements throughout the various figures.

DETAILED DESCRIPTION OF INVENTION

With reference to FIGS. 1-4, a first planter apparatus 10 generally comprises a container 12, a planter cage frame 14, and clips 16 for releasably securing the planter cage frame 14 to the container 12. The container 12 may be filled with soil and planted with one or more live goods or plants, and the planter cage frame 14 may then be positioned on the container 12 and releasably secured thereto by the clips 16. Thereafter, the planter cage frame 14 and live goods growing up it will not tip over or bend with respect to the container 12, and the entire planter assembly 10 including the live goods planted therein may be moved as a unitary assembly by grasping the planter cage frame 14, the container 12, or both.

Figure 1:
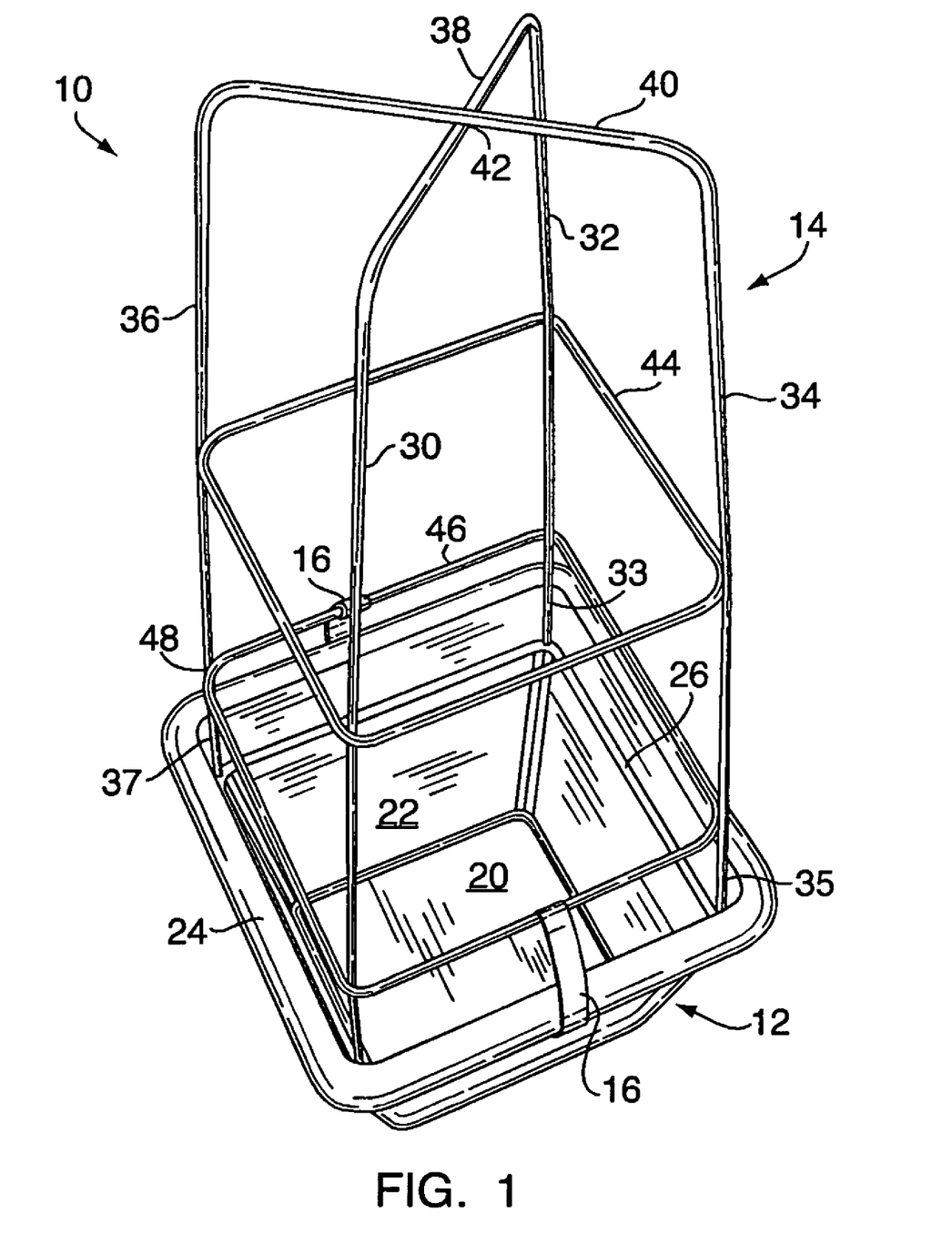
FIG. 1 is a perspective view of a first planter apparatus for live goods, according to the invention herein.
Figure 2:
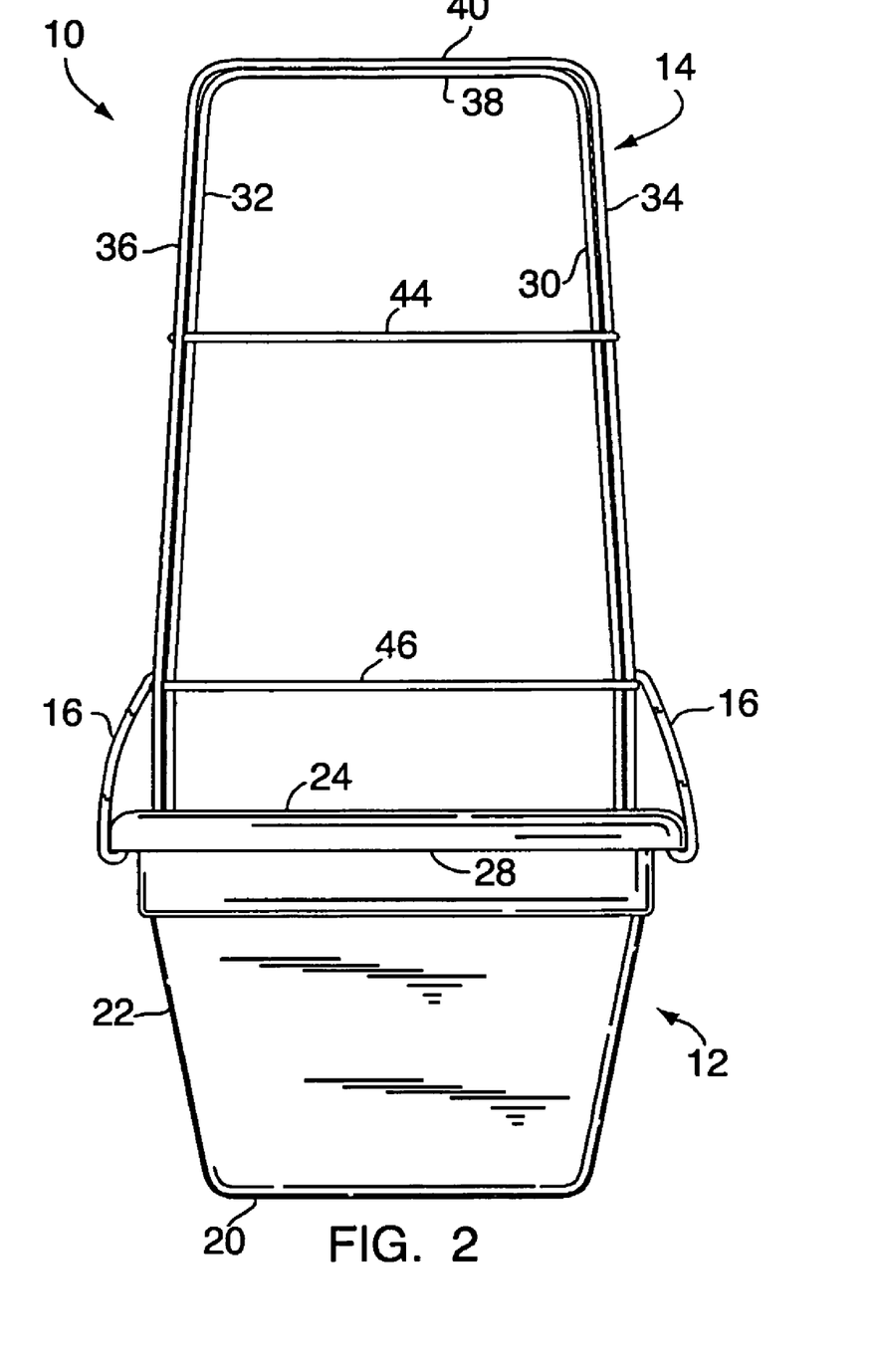
FIG. 2 is a side elevation view of the planter apparatus of FIG. 1.
Figure 3:
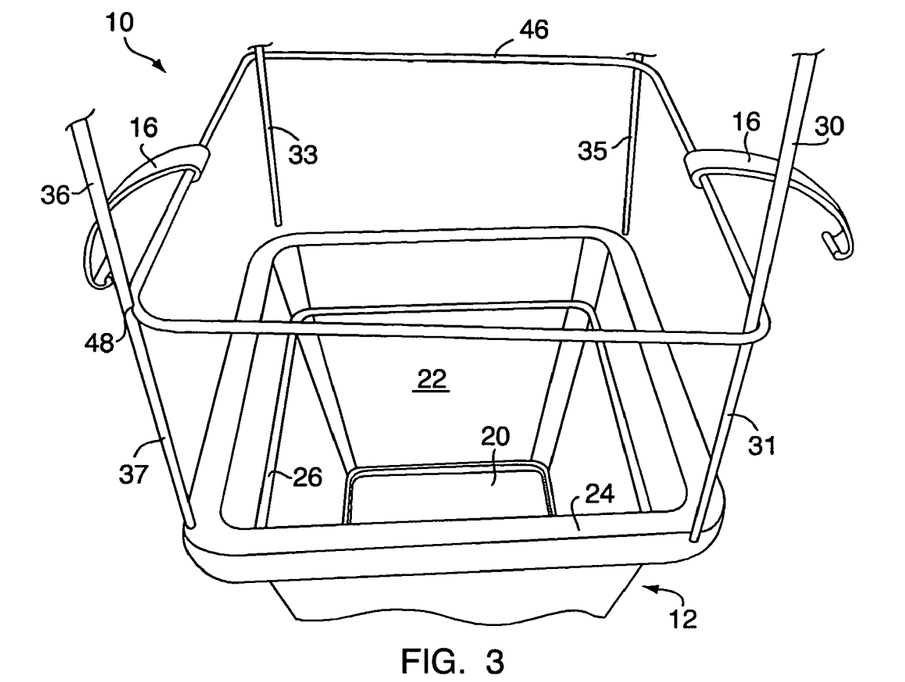
FIG. 3 is a perspective fragmentary view of the planter apparatus of FIG. 1 with the planter cage frame separated from the container.

The container 12 has a bottom 20 and a sidewall 22 including a rim 24 at the top of the sidewall 22. The bottom of the container 20 is rectangular, and more particularly, square. The sidewall 22 defines an inner peripheral ledge 26 spaced downwardly from the rim 24. The rim 24 is a turned over upper portion of the wall 22, terminating in a downwardly disposed rim edge 28. This provides an upwardly open container with a rectangular, and more particularly, square opening.

The container 12 may be constructed in any suitable manner. A container formed by injection molded plastic construction is preferred, as it provides an attractive container at a reasonable cost. However, clay or terra cotta containers will also suffice as will other materials, as desired.

The planter cage frame 14 has four downwardly extending legs 30, 32, 34 and 36. Legs 30 and 32 are integral with and extend downwardly from a top frame rib 38, and legs 34 and 36 are integral with and extend downwardly from a top frame rib 40. The legs 30, 32, 34 and 36 are characterized as "downwardly extending" because they extend downwardly from the top ribs 38 and 40 toward the container 12. The top ribs 38 and 40 are preferably secured together at 42.

The planter cage frame 14 further comprises an upper transverse rib 44 and a lower transverse rib 46. The transverse ribs 44 and 46 extend between each of two adjacent downwardly extending legs. The lower transverse rib 46 extends between the downwardly extending legs 30 and 34, extends between the downwardly extending legs 32, 34, extends between the downwardly extending legs 32 and 36, and extends between the downwardly extending legs 30 and 36. In the planter apparatus 10 shown, the transverse ribs 44, 46 extend between all of the adjacent downwardly extending legs, but it is sufficient for that the lower transverse rib 46 extend between only two adjacent downwardly extending legs, i.e., the transverse rib need not be continuous about the periphery of the planter cage frame. However, it is preferred that the lower transverse rib 46 include at least two portions that are on opposite sides of the planter cage frame 14. The upper and lower transverse ribs 44 and 46 are secured to the downwardly extending legs, such as at 48. The downwardly extending legs 30, 32, 34 and 36 have, respectively, distal ends 31, 33, 35 and 37.

The planter cage frame 14 is preferably fabricated of suitably stiff rod material, such as metal wire rod or plastic rod. In metal plant cage frame 14, the top ribs 38 and 40 may be spot welded together at 42 and the transverse ribs may be spot welded to the downwardly extending legs, such as transverse rib secured to downwardly extending leg 36 at 48. The planter cage frame 14 may be painted or coated, as desired, both for appearance and protection. If the planter cage frame 14 is made of plastic, it may be molded as a unitary piece or made of stiff rod material that is sonically welded together.

When the apparatus is assembled as shown in FIGS. 1 and 2, the distal ends 31, 33, 35 and 37 of the downwardly extending legs 30, 32, 34 and 36 rest on the inner peripheral ledge 26, at the corners of the sidewall 22. In FIG. 3, the relationship of the planter cage frame 14 and the container 12 are illustrated prior to the planter cage frame 14 being assembled onto the container 12. It will be noted that the distal ends 31, 33, 35, 37 of the downwardly extending legs 30, 32, 34, 36 are spaced apart or spread with respect to the inner peripheral ledge 26, such that the lower portions and distal ends of the downwardly extending legs are deformed inwardly to insert the planter cage frame 14 into the container 12. This is desirable as the distal ends 31, 33, 35, and 37 are thereby biased against the inside of the sidewall 22, which maintains the distal ends 31, 33, and 37 on the inner peripheral ledge 26.

Figure 4:
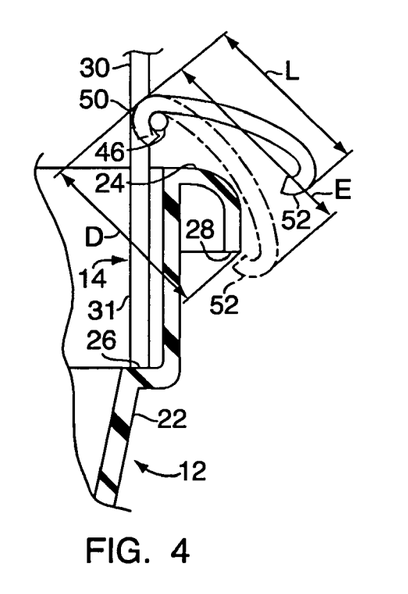
FIG. 4 is a fragmentary view of a transverse rib, container rim and clip of the planter apparatus of FIG. 1, showing how the clip is flexed to attach the planter cage frame to the container.

The planter cage frame 14 is releasably secured to the container 12 by clips 16. There are two clips 16 on the rectangular container 12 hooked to opposed portions of the rim 24 and transverse rib 46. Two opposed clips 16 provides a stable attachment, such that the planter apparatus 10 may be lifted by the top frame ribs 38, 40. The operation of one of the clips 16 is best illustrated in FIG. 4. The clip 16 is C-shaped when viewed from the side, and is formed of a resilient, memory retentive material such as spring steel. The clip 16 has a first hook 50 at one end thereof, and a second hook 52 at the second end thereof. The hook 52 is sized and configured to fit over and engage the lower transverse'rib 46, and the hook 52 is sized and configured to fit over and engage the rim edge 28.

When the planter cage frame 14 is received on the container 12, the lower transverse rib 46 is spaced from the rim edge 28 by a distance D, the hook 50 is fitted over transverse rib 46 and the length of L of the clip 16 in its relaxed condition is less than the distance D. As shown in dotted lines in FIG. 4, the clip 16 may be deformed or straightened by manual manipulation such that it has an elongated length of E which is greater than the distance D. This permits the hook 52 to be fitted over the rim edge 28. When the clip 16 is released from the deformed condition necessary to install it between the transverse rib 46 and the rim edge 28, the memory retentive aspect of the clip 16 engages hook 52 with rim edge 28 and holds the clip 16 in position for securing the planter cage frame on the container 12. The clip 16 can, of course, be removed by deforming it to its elongated condition E and disengaging hook 52 from the rim edge 28. Alternatively, hook 52 can be engaged first, and hook 50 can be engaged or disengaged by deforming clip 16.

The planter apparatus 10 may be used by filling the container 12 with soil and planting live goods, or seeds for live goods, and thereafter securing the planter cage frame 14 to the container 12. The live goods will then grow upwardly into the planter cage frame 14, and will be supported by the planter cage frame 14. Because the planter cage frame 14 is secured to the container 12, the planter cage frame and the live goods supported thereby will not tip over or bend with respect to the container 12. Further, if it is decided to move the planter apparatus 10 including the live goods, this can be accomplished by grasping one or both of the top frame ribs 38, 40, efficiently and conveniently facilitating such a movement.

If it is decided to reuse the planter apparatus 10, the clips 16 may be disconnected and the planter cage frame 14 removed for cleaning the container 12 and planting new live goods therein.

Figure 5:
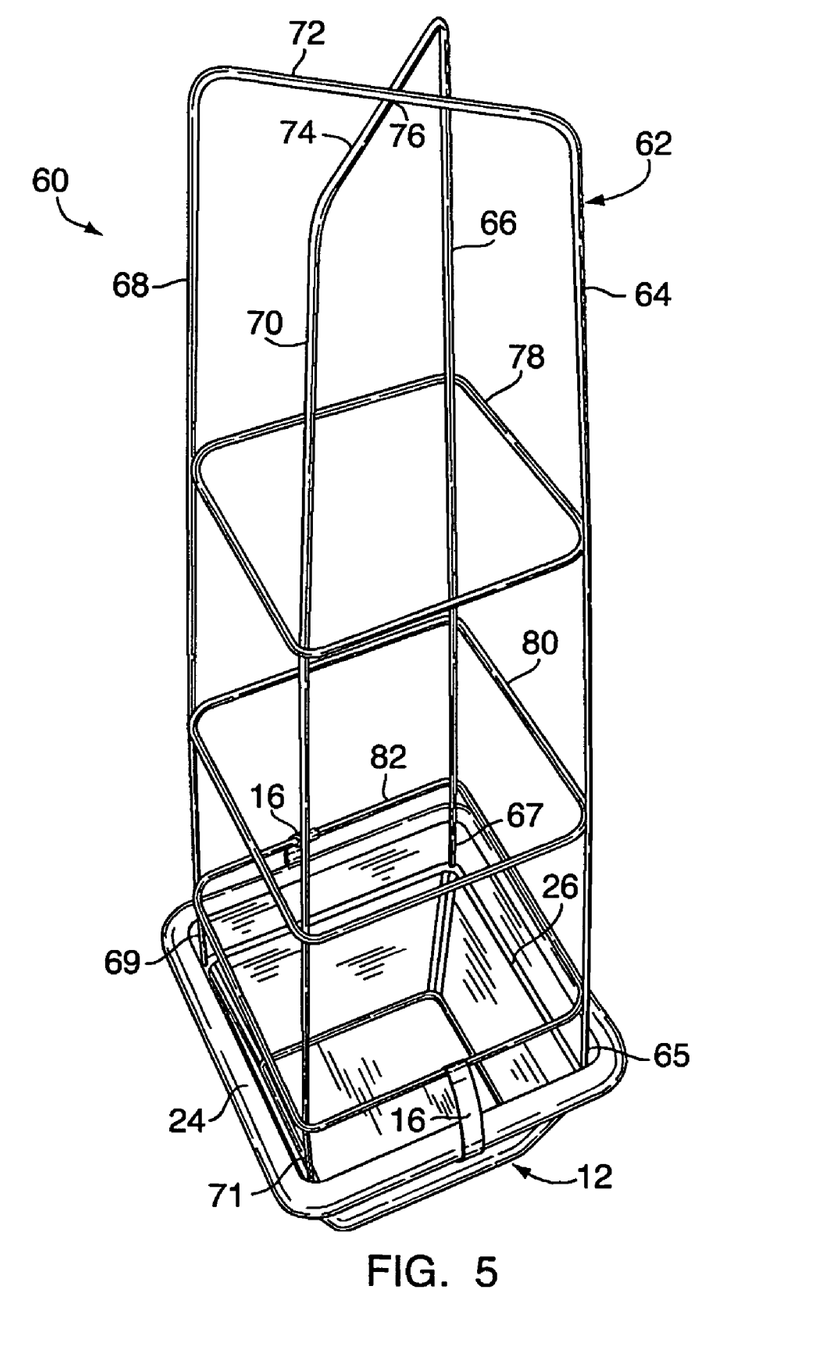
FIG. 5 is a perspective view of another planter apparatus according to the invention herein.
Figure 6:
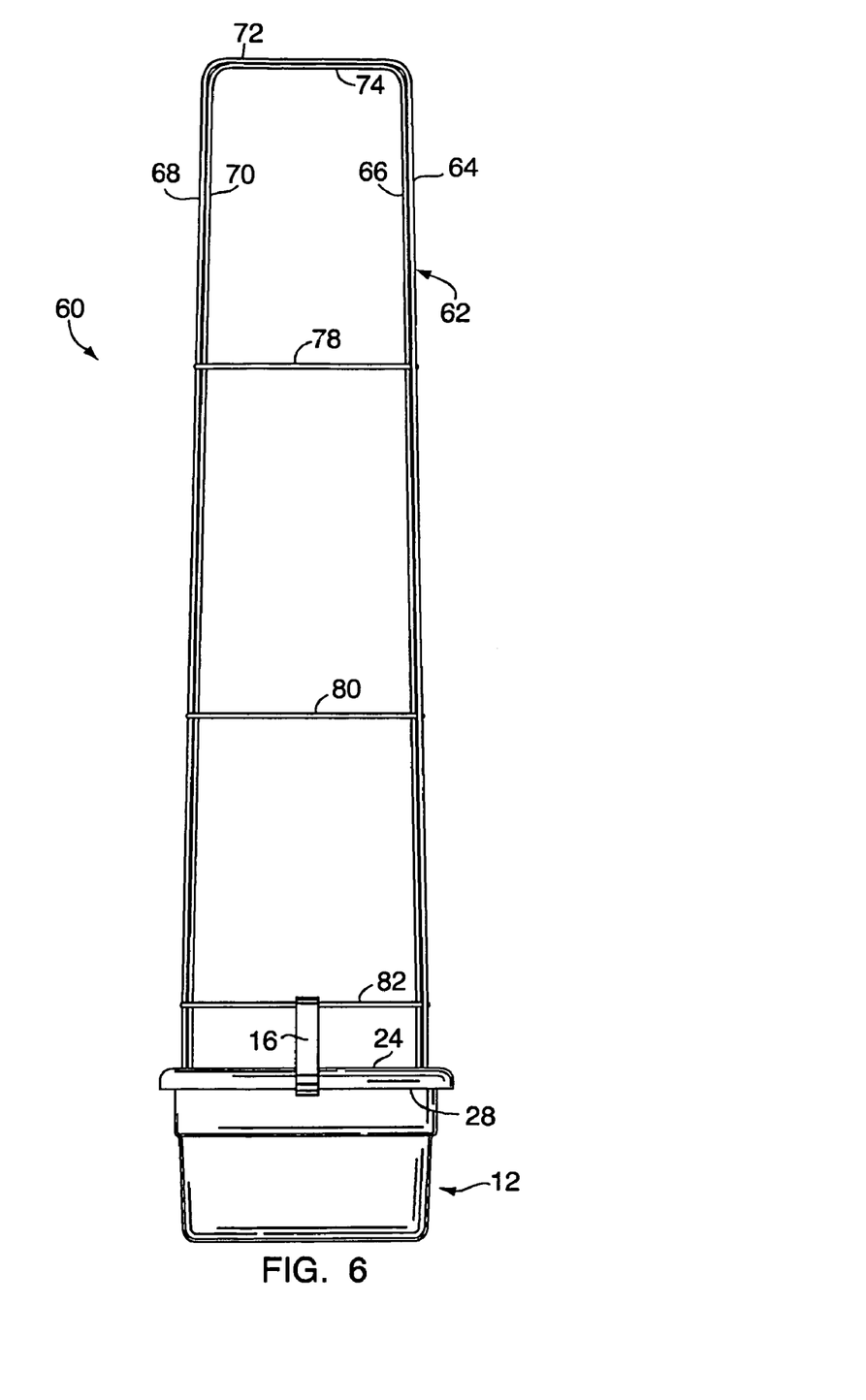
FIG. 6 is a side elevation view of the planter apparatus of FIG. 5.

With reference to FIGS. 5 and 6, a second planter assembly 60 is illustrated. It also generally comprises the container 12, and a planter cage frame 62 releasably secured to the container 12 by two clips 16. The planter apparatus 60 differs from the planter apparatus 10 by having a taller planter cage frame 62 so that it may accommodate and support taller live goods.

To the foregoing purpose, the planter cage frame 62 generally comprises four downwardly extending legs 64, 66, 68 70, with legs 64, 68 being connected by an integral top frame rib 72 and legs 66, 70 being connected by an integral top frame rib 74. The top frame ribs 72, 74 are joined, such as by welding, as illustrated at 76. The legs 64, 66, 68 and 70 have respective distal ends 65, 67, 69 and 71 that are received on the inner peripheral ledge 26 of the container 12.

Because the planter cage frame 62 is tall, it is provided with three transverse ribs, namely, an upper transverse rib 78, a medial transverse rib 80 and a lower transverse rib 82. The clips 16 attach the lower transverse rib 82 to the container 12 in the manner shown in FIG. 4 and it is preferred that the two clips 16 attach opposite segments of the transverse rib 82 to the rim edge 28 of rim 24.

Figure 7:
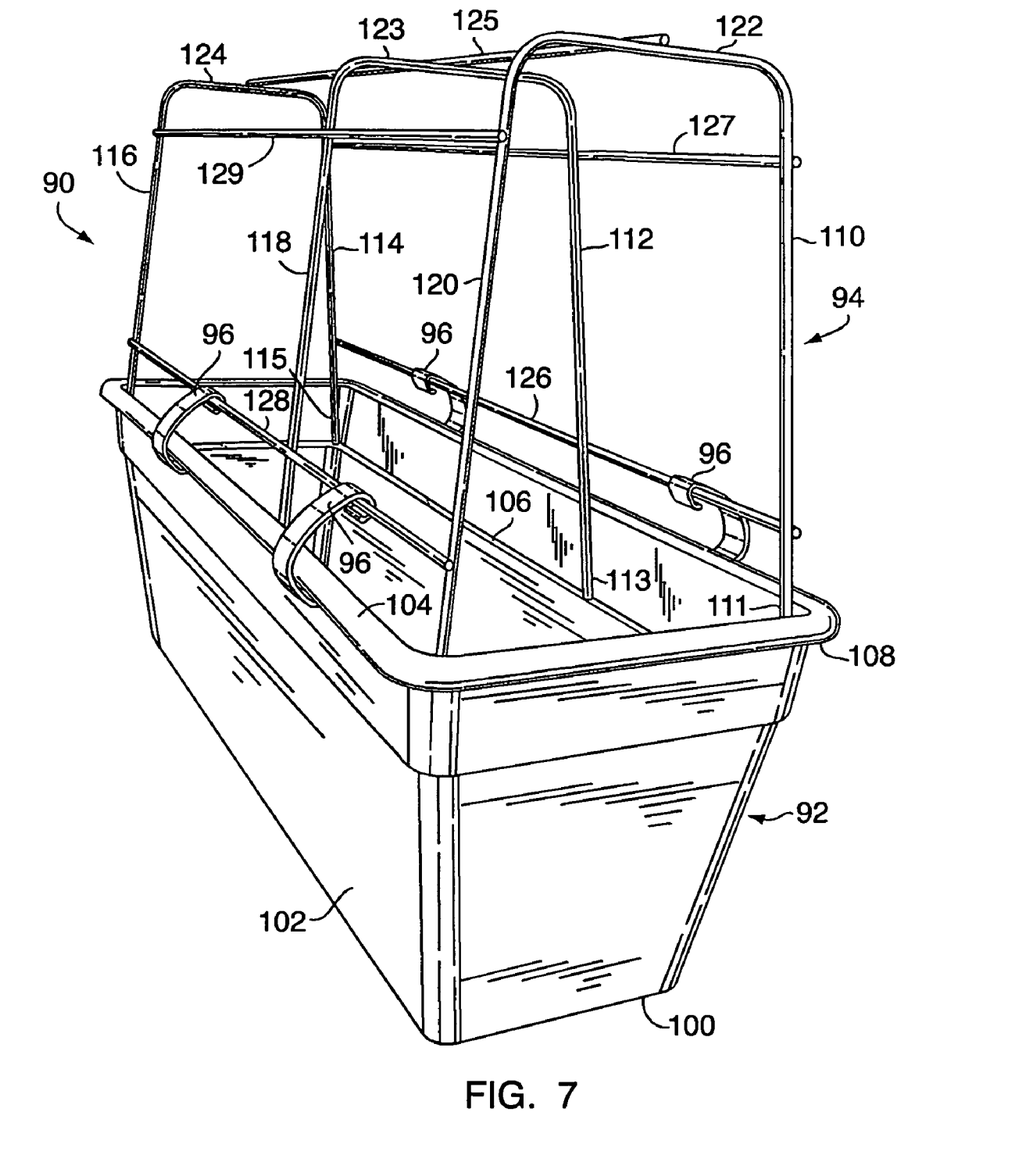
FIG. 7 is a perspective view of another planter apparatus according to the invention herein.

A planter apparatus 90 shown in FIG. 7, generally comprises a container 92, a planter cage frame 94 and clips 96. The planter apparatus 90 is characterized by an elongated rectangular upwardly open container 92 having a rectangular bottom 100, and a sidewall 102 having a rim 104 spaced upwardly from the bottom 100. Therefore, the planter apparatus 90 is suitable for multiple live goods planted in a row. The rim 104 is an everted portion of the sidewall 102 terminating in a rim edge 108. The sidewall 102 defines an inner peripheral ledge 106 spaced downwardly along the sidewall 102 from the rim 104.

The planter cage frame 94 has six downwardly extending legs, 110, 112, 114, 116, 118, and 120, each terminating respectively in distal ends 111, 113, 115, 117, 119 and 121 that are received on the inner peripheral ledge 106 at the corners of the container 92. The downwardly extending legs 110, 120 are integral with and connected by an integral top frame rib 122, the downwardly extending legs 112 and 118 are integral with and connected by a top frame rib 123 and the downwardly extending legs 114, 116 are integral with and connected by top frame rib 124. The top frame ribs 122, 123 and 124 are connected by a handle top frame rib 125 which facilitates picking up and carrying the planter assembly 90.

A lower transverse rib 126 connects and is deployed between the downwardly extending legs 110, 112 and 114 and a lower transverse rib 128 is deployed between and connects each of the downwardly extending legs 116, 118 and 120. The lower transverse ribs 126, 128 are spaced from the rim 104 of container 92 and the clips 96 are installed in the manner shown in FIG. 4 to secure the lower transverse ribs 126, 128 to rim edge 108 and thereby releasably attach the planter cage frame 94 to the container 92. The clips 96 are also C-shaped clips similar to clips 16 described above, but are slightly larger for use with the longer container 92. Four clips 96 are provided, spaced as shown.

The planter cage frame 94 is also provided with two upper transverse ribs 127, 129, respectively connected to and extending between downwardly extending legs 110, 112 and 114, and between downwardly extending legs 116, 118 and 120. This adds rigidity to the planter cage frame and also provides additional gripping locations for moving the planter apparatus 90, as desired.

Figure 8:
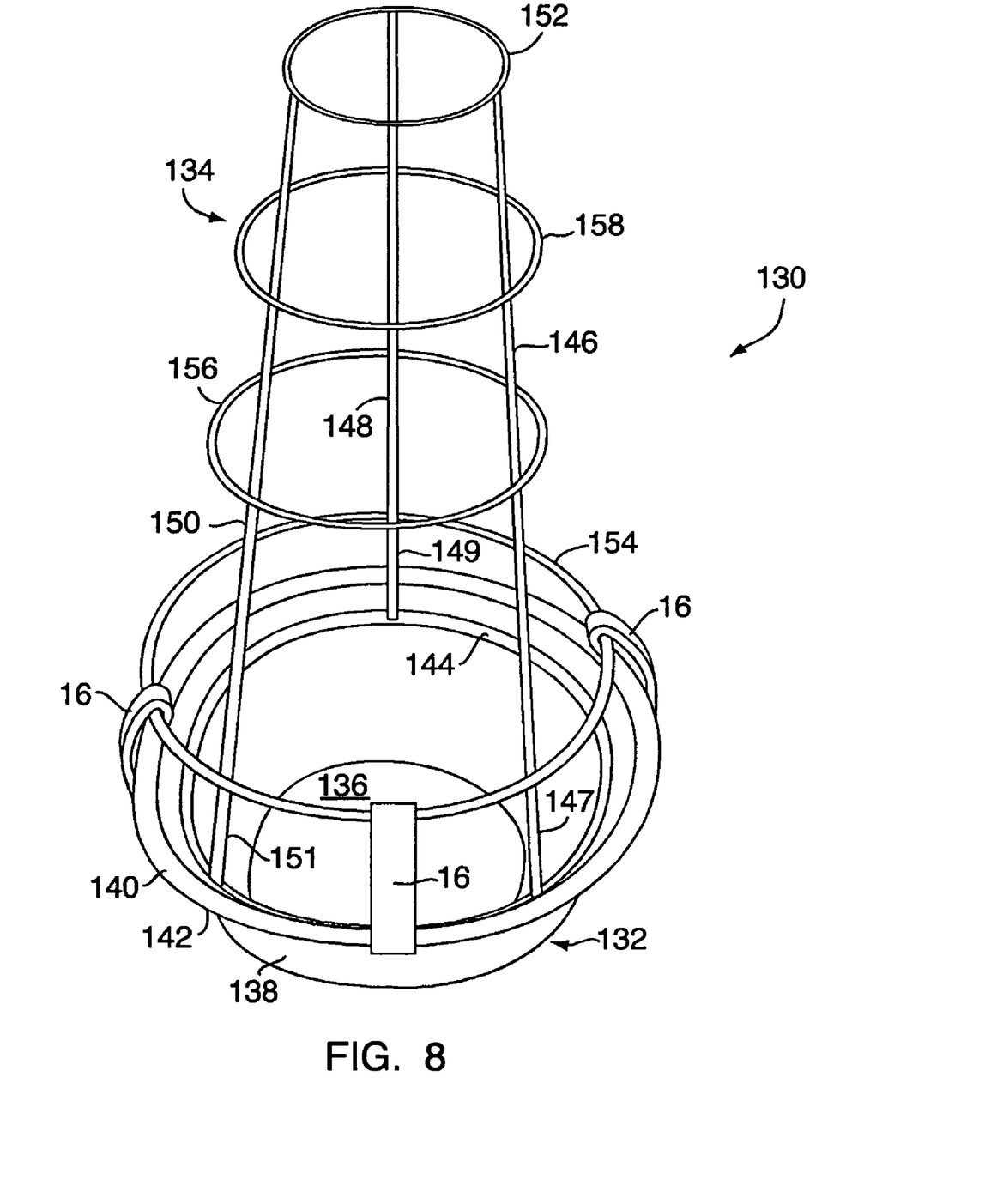
FIG. 8 is a perspective view of another planter apparatus according to the invention herein.

FIG. 8 illustrates another planter assembly 130 according to the invention herein. The planter assembly 130 generally comprises a container 132, a planter cage frame 134 and clips 16 securing the planter cage frame 134 to the container 132.

The container 132 has a round bottom 136 and a sidewall 138 extending upwardly to an annular round rim 140 having a downturned rim edge 142, thereby providing a round opening. The sidewall 138 defines an annular inner peripheral ledge 144, spaced downwardly from the rim 140. The planter cage frame 134 has three equally spaced apart downwardly extending legs 146, 148 and 150, respectively having distal ends 147, 149 and 151 that are received and engaged against the peripheral ledge 144.

The planter cage frame 134 has a top circular frame rib 152 secured to the upper ends of each of the legs 146, 148 and 150, and the top frame rib 152 provides a convenient gripping area for moving the planter assembly 130. Lower circular transverse rib 154 extends between adjacent downwardly extending legs 146, 148 and 150, spaced upwardly from the distal ends resting on the peripheral ledge to provide the appropriate spacing for attaching releasable clips 16 between the rim edge 142 and the lower transverse rib 154. Three clips 16 are preferably provided with one clip being installed equi-distance between adjacent legs. Two medial transverse ribs 156 and 158 are also provided, and these ribs are also circular and attached to each of the legs 148, 150 and 152. The medial ribs 156 and 158 provide structural stiffness to the planter cage frame 134 and provide for supporting live goods planted in the container 132.

Figure 9:
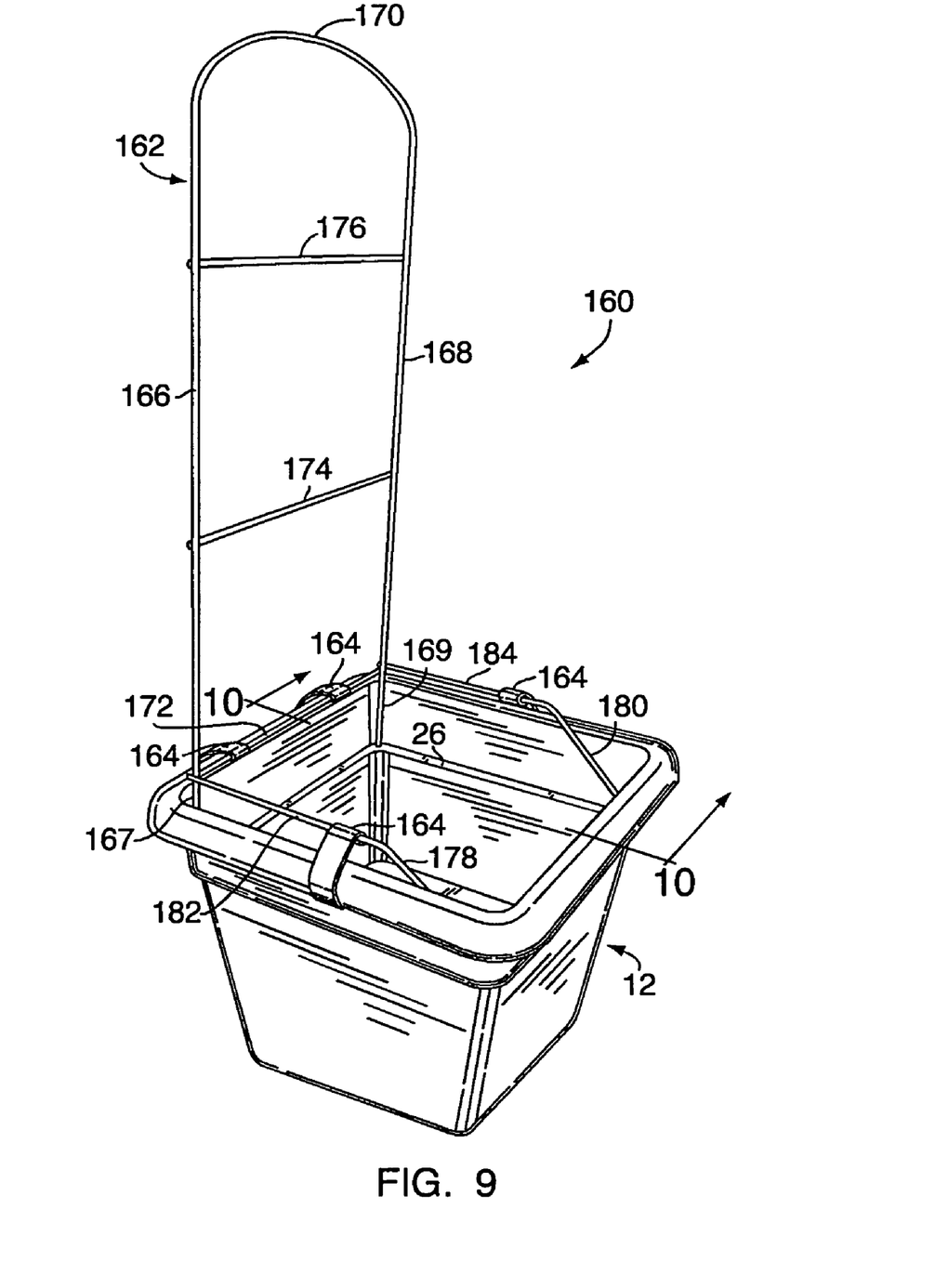
FIG. 9 is a perspective view of another planter apparatus according to the invention herein.
Figure 10:
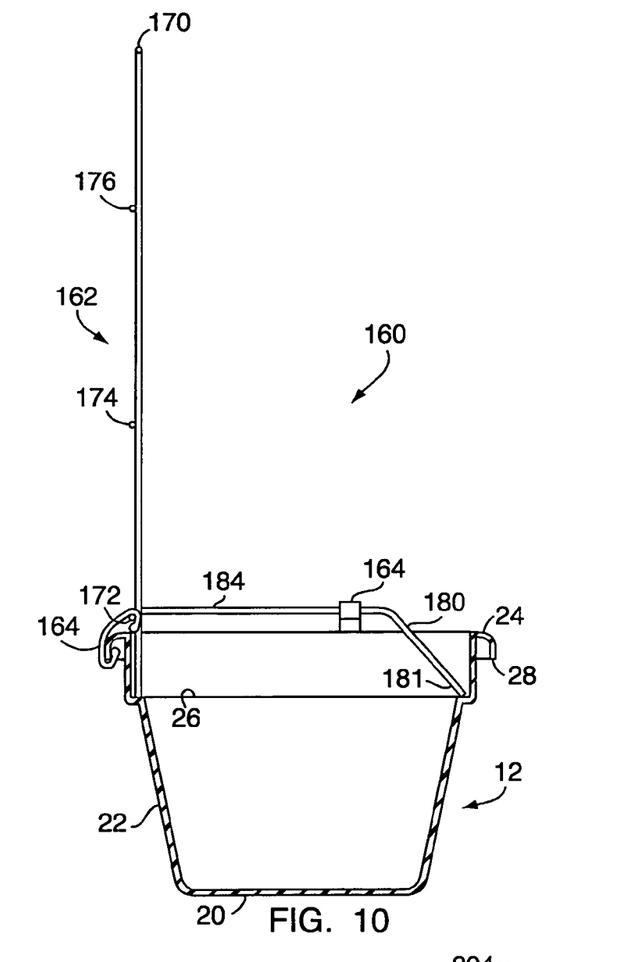
FIG. 10 is a sectional view, of the planter apparatus of FIG. 9 taken along the lines 10-10 of FIG. 9.

In FIGS. 9 and 10, trellis-style planter assembly 160 is shown. It generally comprises the container 12, a planter cage frame 162 and clips 164 securing the planter cage frame 162 to the container 12. The container 12 is as described above with respect to planter apparatus 10.

The planter cage frame 162 has first and second downwardly extending legs 166 and 168, having respective distal ends 167 and 169 engaged on the inner peripheral ledge 26 at adjacent corners of the container 12. The downwardly extending legs 166 and 168 are integral with and connected by a top frame rib 170. Downloadly extending legs 166 and 168 form the trellis portion of the planter cage frame 162, which is further provided with a lower transverse rib 172 and two medial transverse ribs 174 and 176.

The planter cage frame 162 has two additional downwardly extending legs 178 and 180 that are integral with and depend from two additional lower transverse ribs 182 and 184, respectively. The legs 178 and 180 are preferably angled, as shown, but may be vertical if desired. When the planter cage frame 162 is installed on the container 12 as shown in FIGS. 9 and 10, the lower transverse ribs 182, 184 extend from the legs 166, 168 along the rim 24 and are spaced apart therefrom, so that the respective distal ends 179 and 181 of legs 178, and 180 rest on the inner peripheral ledge 26. The clips 164 secure the transverse ribs 182, 184 to the rim 24 and additional clips 164 secure the lower rib 172 to the rim 24, the clips 164 being sized as required. The spacing between the lower transverse ribs 172, 182, 184 and the rim edge 28 may be selected to use clips 16, if desired. The planter assembly 160 with its trellis-style planter cage frame 162 illustrates how various configurations of planter cage frames can be provided to accommodate various types of live goods, planter assembly 160 being well suited to flowering plants with a frontal floral display.

Figure 11:
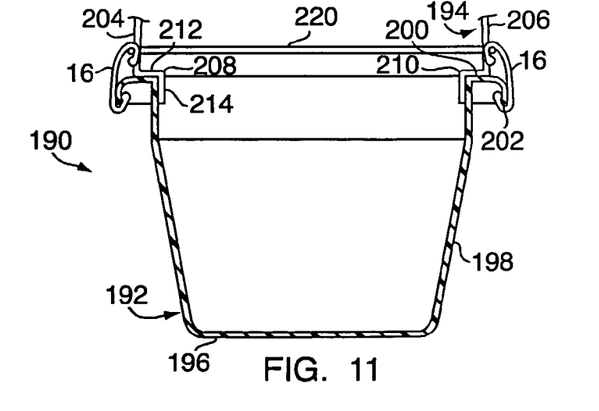
FIG. 11 is a sectional view of another planter apparatus according to the invention herein.

In FIG. 11, another planter assembly 190 is shown, generally comprising a container 192, a planter cage frame 194 and clips 16 securing the planter cage frame to the container 192. The container 192 has a bottom 196 and a sidewall 198 including a rim 200 and a rim edge 202. The planter cage frame 194 has depending legs 204 and 206 with L-shaped distal ends 208 and 210. The distal end 208 has an offset component 212 and a downward component 214, wherein the offset component 212 rests on the rim 200 and the downward component 214 engages the sidewall 198 of container 192 adjacent the rim 200 for positioning the planter cage frame 194 on the container 192. Two additional downwardly extending legs are provided, similar to legs 206, 208, but are not seen in FIG. 11 because the view is sectional.

The planter cage frame 194 has a transverse lower rib 220 spaced from the rim 200. Clips 16 are deployed between the transverse rib 220 and the rim 200, engaging the rim edge 202. The remainder of the planter cage frame 194, cut away in FIG. 11, is the same or similar to the planter cage frames 14 or 62 described above. Clips 16 deployed between the transverse rib 220 and rim edge 202 releasably secure the planter cage frame 194 to the container 192.

The distal ends 208, 210 of the downwardly extending legs 204, 206 of the planter cage frame 194 adapt the planter cage frame 194 for use with the variety of containers, which are not limited to having an inner peripheral ledge 26 as provided in container 12.

Figure 12:
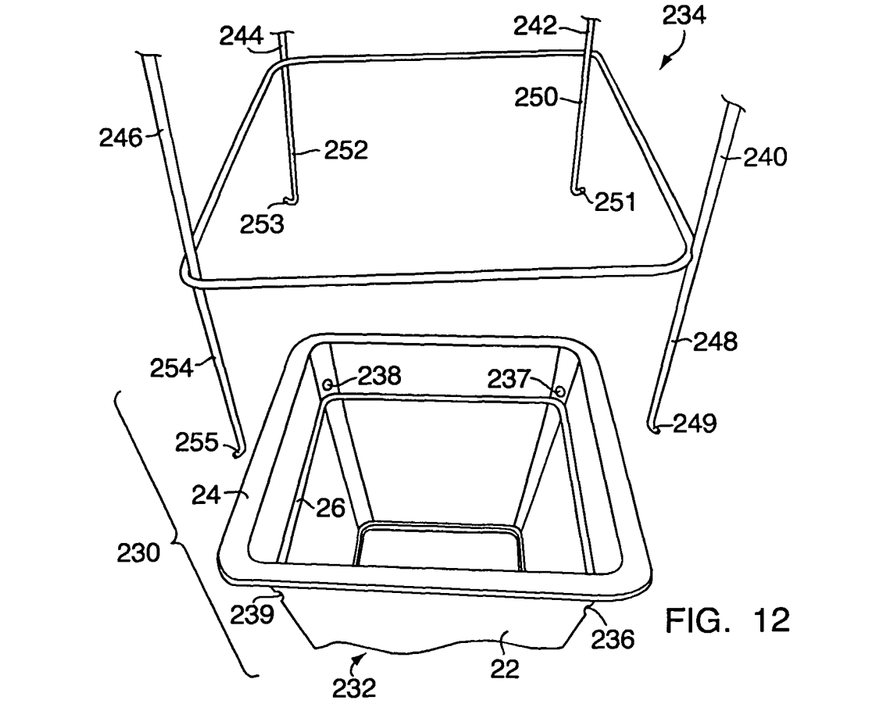
FIG. 12 is an exploded perspective view of another planter apparatus according to the invention herein.
Figure 13:
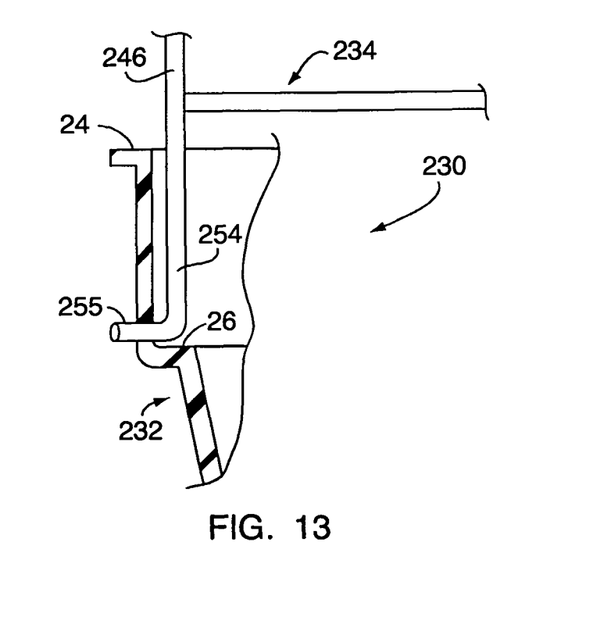
FIG. 13 is a fragmentary view of the planter apparatus of FIG. 11, in its assembled condition.

With reference to FIGS. 12 and 13, another planter apparatus 230 according to the invention herein is illustrated. It generally comprises a container 232 and a planter cage frame 234. The container 230 is similar to the container 12 described above having a sidewall 22, rim 24, and an inner peripheral ledge 26 spaced from the rim 24. However, the container 232 is characterized by four openings 236-239 formed through the sidewall 22 adjacent the inner-peripheral ledge 26, and at the corners of the container 232 and does not require a rim edge.

The planter cage frame 234 has depending legs 240, 242, 244 and 246 with respective distal ends 248, 250, 252 and 254. The distal ends are L-shaped with respective prongs 249, 251, 253 and 255 extending outwardly with respect to the legs 240, 242, 244 and 246. As best seen in FIG. 12, the prongs 249, 251, 253 and 255 respectively extends through openings 236-239 to secure the planter cage frame 234 to the container 232. The distal ends 248, 250, 252 and 254 of legs 240, 242, 244 and 246 of the planter cage frame 234 rest on the inner peripheral ledge 26 which supports the planter cage frame 234 on the container. The planter cage frame 234 is also provided with transverse ribs and top ribs not shown but the same or similar to the planter cage frames 14 or 62 in this regard. The planter apparatus 230 provides for releasably securing a planter cage frame to a container, but does not require clips to do so.

All of the foregoing planter apparatus provide a secure assembly of a planter cage frame and container, for supporting live goods without the danger of tipping breaking or bending, and further providing a convenient manner of moving planter assemblies and live goods grown therein from place to place. Accordingly, the planter apparatus described admirably achieve the objects of the invention. Those skilled in the art will appreciate that the embodiments disclosed are intended to illustrate the invention and that various modifications and changes may be made without departing from the spirit and scope of the invention, which is limited only by the following claims.

I claim:

1. Planter apparatus for supporting live goods, comprising:
   A) an upwardly open rectangular container for containing soil and live goods planted therein, the rectangular container having a bottom, and a sidewall extending from the bottom to a rim and configured and arranged with an inner peripheral ledge off set from said rim, the inner peripheral ledge having four corners;
   B) a planter cage frame configured with four downwardly extending legs arranged in spaced relationship with respect to one another, the downwardly extending legs having upper and distal ends, two top ribs each respectively connecting the upper ends of two of the downwardly extending legs, and first transverse rib positioned between each two adjacent downwardly extending legs to thereby join the four downwardly extending legs, the first transverse rib spaced upwardly from the distal ends of said downwardly extending legs, the downwardly extending legs, top ribs and first transverse rib permanently joined together to form a one piece planter cage frame, said planter cage frame receivable on said container with the distal ends of the downwardly extending legs respectively supported on the inner peripheral ledge of the container sidewall at the four corners thereof and with the to ribs extending diagonally across the rectangular container; and
   C) two clips arranged for releasable attachment to said first transverse rib and to said rim at opposed positions thereon for retaining said planter cage frame and said container together, thereby configuring a single cooperative planter assembly that is liftable by grasping one or both top ribs.

2. The planter apparatus as defined in claim 1 wherein said rectangular container is a square container.

3. The planter apparatus as defined in claim 1 further comprising at least one additional transverse rib respectively connecting the four downwardly extending legs and deployed in a spaced relationship between the first transverse rib and the top ribs, said at least one additional transverse rib being permanently attached to the downwardly extending legs.

4. The apparatus as defined in claim 1 wherein said two clips are configured in a "C" shape with two ends and are made of a resilient, memory retentive material deformable for increasing the distance between said respective ends of each of said clips from an at rest, shorter distance between said respective ends to a longer distance between said respective ends for facilitating connection between said transverse rib and said container.

5. The planter apparatus as defined in claim 4 wherein each of said clips has one hook end configured to hook onto said first transverse rib and an opposite hook end configured to hook onto a rim edge of said container.

6. The planter apparatus as defined in claim 1 wherein said planter cage frame is constructed of a stiff wire material and the downwardly extending legs and first transverse rib are welded together.

7. The planter apparatus as defined in claim 1 wherein said planter cage frame is constructed of a plastic material.

8. The apparatus as defined in claim 1 wherein said container is an injection molded plastic container.

9. The planter apparatus as defined in claim 1 wherein each of the two top ribs is respectively integral with two of the four downwardly extending legs.

10. Planter apparatus for supporting live goods comprising:
   A) an upwardly open container having a bottom, a sidewall extending from the bottom and including a rim at the top thereof and a peripheral inner ledge adjacent said rim, the sidewall defining four spaced apart openings adjacent said inner peripheral edge;
   B) a planter cage frame configured with four downwardly extending legs arranged in spaced relationship with respect to each other, each of the downwardly extending legs having a distal end adapted to engage the container sidewall on the inner ledge thereof adjacent said rim and two top ribs crossing each other and respectively connecting the upper ends of two downwardly extending legs to provide for gripping the planter cage frame at an upper end thereof, and at least one transverse rib adapted to support growing live goods, the downwardly extending legs, top ribs and transverse rib connected as a one piece planter cage frame; and C) four prongs comprising the distal ends of the four downwardly extending legs and configured for respectively extending through said openings defined by the sidewall for releasably securing the planter cage frame to said rim of the container to form a unitary planter apparatus that is moveable and liftable, by manipulations of the planter cage frame.

* * * * *

UNITED STATES PATENT AND TRADEMARK OFFICE
CERTIFICATE OF CORRECTION

| | | |
|---|---|---|
| PATENT NO. | : 8,186,101 B2 | Page 1 of 1 |
| APPLICATION NO. | : 12/448686 | |
| DATED | : May 29, 2012 | |
| INVENTOR(S) | : Jennifer A. Kurtz | |

It is certified that error appears in the above-identified patent and that said Letters Patent is hereby corrected as shown below:

In column 8, line 14, "with the to" should be --with the top--.

In column 8, line 36, after "said" insert --first--.

Signed and Sealed this
Thirty-first Day of July, 2012

David J. Kappos
*Director of the United States Patent and Trademark Office*